Dec. 17, 1929.  E. W. CRELL  1,739,711
GAUGING DEVICE
Filed April 12, 1926
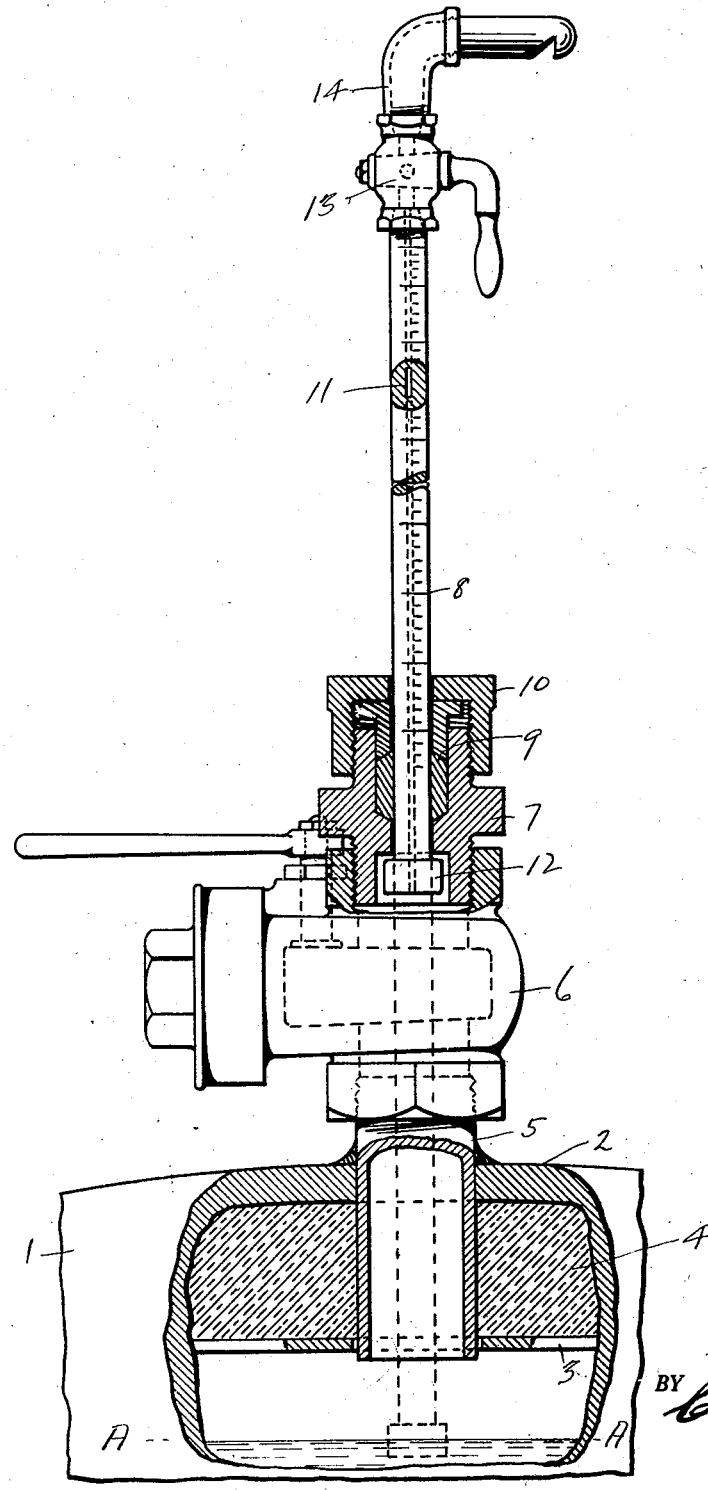
INVENTOR
E. W. Crell
BY Charles L. Stokes
his ATTORNEY Patented Dec. 17, 1929

1,739,711

UNITED STATES PATENT OFFICE

EDWARD W. CRELL, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA

GAUGING DEVICE

Application filed April 12, 1926. Serial No. 101,447.

My invention relates to improvements in gauging devices whereby the volume of liquid in a tank, or container, under pressure may be easily determined within very slight limits or error.

The principal object of my invention is to provide a gauging device for determining the volumes of volatile liquids, such as gasoline and the like, being transported in tank cars or being contained in stationary tanks, wherein autogenous pressure is developed from the vapors of the liquid being gauged.

Another object of my invention is to provide an operative gauging device for ascertaining the volume of liquids in a container under pressure, irrespective of whether the pressure is developed from the vapors of a volatile liquid being measured or is an externally applied pressure.

Another object of my invention is to provide an indicator operated by differential pressures for indicating the volume of liquid in a container, no matter whether the container be full or only partly filled, and also for indicating when a certain volume of liquid has been placed in a container on filling the same.

The figure shows an assembly view, partly in section, showing the gauging device and means for introducing the same into the tank.

Another object of my invention is to provide a gauging device which may also be used as a sampling device.

Referring to the drawing, it will be seen that a portion of a tank car 1 is shown having an outer shell 2, an inner shell 3, and being suitably insulated therebetween at 4. A standpipe 5 is welded in suitable and gas tight relation between the inner shell 3 and the outer shell 4 and standpipe 5 has a quick opening valve 6 threaded thereto.

The standpipe 5 and quick opening valve 6 may form a standard permanent installation to be affixed to the dome of a tank car as illustrated or to any suitable portion of a stationary tank, and the upper part of valve 6 is adapted to receive, when required for gauging, or sampling, a fitting 7 through the center of which is adapted to slide a gauging pipe 8, said pipe 8 being held in substantially gas tight relation with the fitting 7 by packing material 9 and packing nut 10.

Pipe 8 is preferably of small outside diameter and has a small or capillary bore 11 passing through its length, and pipe 8 is held in fitting 7 by a collar 12 whereby the upward motion of pipe 8 is limited. A faucet 13 is affixed to the upper end of pipe 8 and an L 14 may be fastened to faucet 13, said L containing any of a number of well known devices, such as reeds, etc., to form a whistle.

The operation of the device is as follows:

If it be assumed that the tank car 1 is filled with a volatile liquid, such as casinghead gasoline or the like, to the level A—A, a predetermined vapor pressure will exist interiorly of tank car 1 due to the valve 6 being tightly closed. The fitting 7, containing the sliding gauge pipe 8 which is suitably calibrated on its exterior, is thereupon screwed into the upper part of valve 6 and faucet 13 and valve 6 are opened. A slight escape of the vapors under autogenous pressure will thereupon take place through the bore 11, thus causing the whistle in L 14 to sound, and pipe 8 is lowered until its lowermost portion comes in contact with the liquid at the level A—A whereupon the whistling will cease and liquid will be forced through the bore A—A, faucet 13 and L 14. As soon as the escape of this liquid is perceived, faucet 13 is closed and, inasmuch as pipe 8 is calibrated, the depth from the upper edge of nut 10 to the liquid level A—A may be directly read from said calibration.

Inasmuch as the interior capacity of tank car 1 is known to its full capacity up to the bottom edge of the inner shell 3, and such capacities are already in tabular form, by comparing the reading obtained from said calibration with the tables, the exact volume of contained liquid to the level A—A will thus be obtained from the tables which may be corrected, in a well known manner, for temperature etc.

In this manner a very close gauging of liquids may be had because of the differential pressures utilized inasmuch as the operation of my device is dependent solely upon a contact of the lower part of standpipe 8 with the surface of the liquid A—A and requires substantially no immersion for causing the flow of liquid through the bore 11, due to said differential pressures.

It is of course obvious that my gauging device is applicable to tank cars, containers, etc., wherein a liquid to be gauged is nonvolatile by simply placing the interior of such tank cars etc. under a pressure of an air pump or the like in a well known manner and I do not limit myself to the application of my method by autogenous pressure or to liquid being gauged but regard the functions of my device as being applicable to measuring any liquid under pressure.

In filling the tank car 1 with a predetermined volume of liquid, pipe 8 may be lowered into the tank a predetermined distance so that when the liquid level A—A reaches the bottom of column 12 a predetermined volume will have been received. While such liquid is being introduced, the displacement of air in tank car 1 will cause whistling as described and thereafter when the required volume has been produced liquid will be forced out through L 14.

If it is required to sample the liquid in the containers, it is obvious that liquid flowing through L 14, as described, may be suitably trapped for that purpose.

I claim:

1. In combination, a tank, a liquid level gauge comprising a tube depending in said tank, the exposed end of said tube communicating with the outside of said tank, and the other end of said tube communicating with the inside of said tank and adapted to make contact with the surface of the liquid as the latter rises and falls, an audible signal device connected to the exposed end of said tube, said signal device adapted to indicate the flow of vapor through said tube, and also, to indicate the discontinuance of said flow of vapor.

2. In combination, a tank, a liquid level gauge comprising a tube depending in said tank, the exposed end of said tube being calibrated and communicating with the outside of said tank, and the other end of said tube communicating with the inside of said tank and adapted to make contact with the surface of the liquid as the latter rises and falls, a signaling whistle attached to the exposed portion of said tube, said signal device adapted to be sounded by the flow of gas through said tube and to discontinue the sounding when gas ceases to flow through said tube.

3. In combination, a tank, a liquid level gauge comprising a tube depending in said tank, the exposed end of said tube being calibrated and communicating with the outside of said tank, and the other end of said tube communicating with the inside of said tank and adapted to make contact with the surface of the liquid as the latter rises and falls, means for forming a gas tight connection at the point of entry of said tube, said means permitting sliding the tube through said connection, an audible signal device connected at the exposed end of said tube, said signal device adapted to indicate the flow of vapor through said tube and, also, to indicate the discontinuance of said flow of vapor.

4. In combination, a tank, a liquid level gauge comprising a tube depending in said tank, the exposed end of said tube communicating with the outside of said tank, and the other end of said tube communicating with the inside of said tank and adapted to make contact with the surface of the liquid as the latter rises and falls, means of forming a gas tight connection at the point of entry of said tube into said tank, said means permitting sliding the tube through said connection, a signaling whistle attached to the exposed portion of said tube, said signal device adapted to be sounded by the flow of vapor through said tube and to discontinue the sounding when gas ceases to flow through said tube.

Signed at Los Angeles, in the county of Los Angeles and State of California, this 7th day of April, A. D. 1926.

EDWARD W. CRELL.